US006789043B1

(12) United States Patent
Nelson et al.

(10) Patent No.: US 6,789,043 B1
(45) Date of Patent: Sep. 7, 2004

(54) MAGNETIC SENSOR SYSTEM FOR FAST-RESPONSE, HIGH RESOLUTION, HIGH ACCURACY, THREE-DIMENSIONAL POSITION MEASUREMENTS

(75) Inventors: Carl V. Nelson, Rockville Road, MD (US); Bryan C. Jacobs, Sykesville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/401,701

(22) Filed: Sep. 23, 1999

Related U.S. Application Data

(60) Provisional application No. 60/101,534, filed on Sep. 23, 1998.

(51) Int. Cl.$^7$ .................................................. G01B 7/14
(52) U.S. Cl. ........................... 702/152; 702/38; 702/57; 702/65; 702/94; 702/127; 702/150
(58) Field of Search ............................ 367/128; 702/36, 702/37, 38, 57, 65, 66, 67, 94, 95, 92, 93, 115, 127, 150, 153, 183, 190, 197, FOR 103, FOR 104, FOR 105, FOR 106, FOR 110, FOR 124, FOR 130, FOR 134, FOR 135, FOR 144, FOR 155, FOR 164, FOR 170, FOR 171; 324/207.2, 207.21, 207.25, 173, 174, 202; 700/63, 69, 85, 258

(56) References Cited

U.S. PATENT DOCUMENTS

| | | | | |
|---|---|---|---|---|
| 3,836,953 A | * | 9/1974 | Rotier ........................ | 340/16 R |
| 3,866,229 A | * | 2/1975 | Hammack ................ | 235/150.27 |
| 3,996,590 A | * | 12/1976 | Hammack ................ | 343/112 R |
| 4,287,809 A | * | 9/1981 | Egli et al. ................... | 89/41 EA |
| 4,314,251 A | * | 2/1982 | Raab ......................... | 343/112 R |
| 4,642,786 A | * | 2/1987 | Hansen ........................ | 364/559 |
| 4,829,250 A | * | 5/1989 | Rotier ......................... | 324/225 |
| 4,945,305 A | * | 7/1990 | Blood .................... | 324/207.17 |
| 5,214,615 A | * | 5/1993 | Bauer .......................... | 367/128 |
| 5,307,072 A | * | 4/1994 | Jones, Jr. ..................... | 342/147 |
| 5,347,289 A | * | 9/1994 | Elhardt ........................ | 342/448 |
| 5,412,619 A | * | 5/1995 | Bauer .......................... | 367/128 |
| 5,453,686 A | * | 9/1995 | Anderson ............... | 324/207.17 |
| 5,600,330 A | * | 2/1997 | Blood .......................... | 342/463 |
| 5,615,132 A | * | 3/1997 | Horton et al. ................. | 703/7 |
| 5,640,092 A | * | 6/1997 | Motazed et al. ............ | 324/326 |
| 5,646,524 A | * | 7/1997 | Gilboa .................. | 324/207.17 |
| 5,646,525 A | * | 7/1997 | Gilboa .................. | 324/207.17 |
| 5,833,608 A | * | 11/1998 | Acker ......................... | 600/409 |
| 6,073,043 A | * | 6/2000 | Schneider ................... | 600/424 |

FOREIGN PATENT DOCUMENTS

| WO | WO 2000/76884 A2 | * | 5/2001 |
|---|---|---|---|
| WO | WO 2000/17603 | * | 12/2001 |

* cited by examiner

*Primary Examiner*—Hal Wachsman
*Assistant Examiner*—Carl S. W. Tsai
(74) *Attorney, Agent, or Firm*—Francis A. Cooch

(57) ABSTRACT

The position, orientation, velocity and acceleration of remote sensors is determined using magnetic fields. Multiple, arbitrarily oriented magnetic field transmitters are placed in one reference frame (source reference frame), and multiple, arbitrarily oriented magnetic field receivers are placed in a second reference frame (body reference frame). The spatially varying magnetic fields of the transmitters in the source reference frame are sensed by the magnetic field receivers in the body reference frame. The computer algorithm uses a physics-based extended Kalman filter to resolve the position; orientation, velocity and acceleration of the body relative to the source reference frame. The physics-based extended Kalman filter can accommodate the effects of metal in the source and body reference frames and thus allow the system to measure position, orientation, velocity and acceleration under conditions where eddy currents would normally hinder other magnetic position measuring systems. The Kalman filter also allows the use of multiple transmitters and receivers distributed over an arbitrarily large sensing volume, thereby extending the useful range and accuracy of the system. Further, the Kalman filter allows the use of high-speed measurements with minimal signal averaging, thus extending the useful dynamic response of the system. Moreover, the Kalman filter allows the use of arbitrarily oriented transmitters and receivers, thus increasing the flexibility of the system in many applications.

6 Claims, 4 Drawing Sheets

FIG.1
$$\vec{B} = \frac{\mu_0}{4\pi} \cdot \left[ \left[ \frac{2\cos\theta}{\rho^3} \right] \vec{\rho} + \left[ \frac{\sin\theta}{\rho^3} \right] \vec{\theta} \right]$$
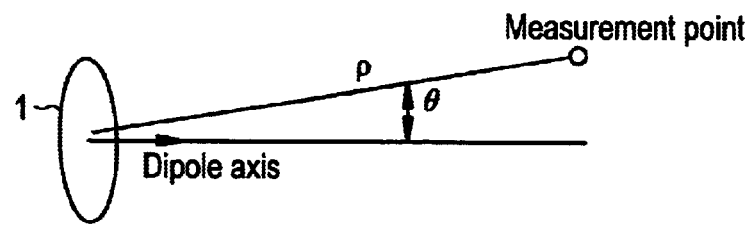
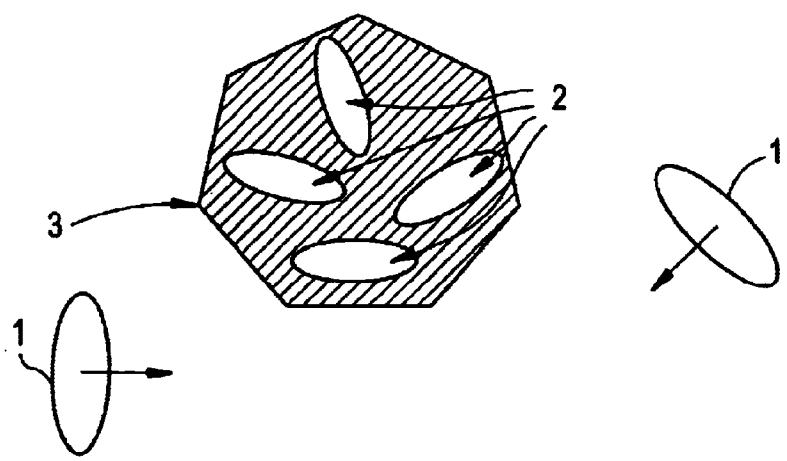

FIG.2A
FIG.2B
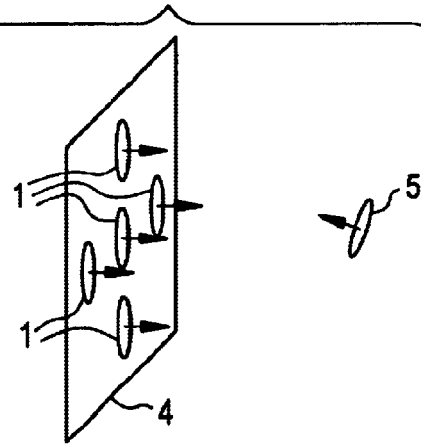
FIG.2C
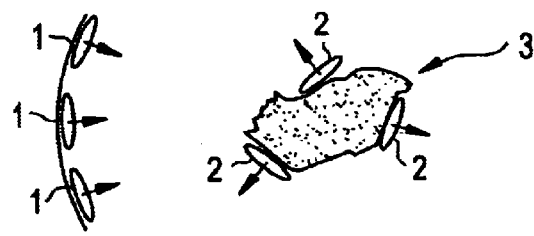
FIG.2D
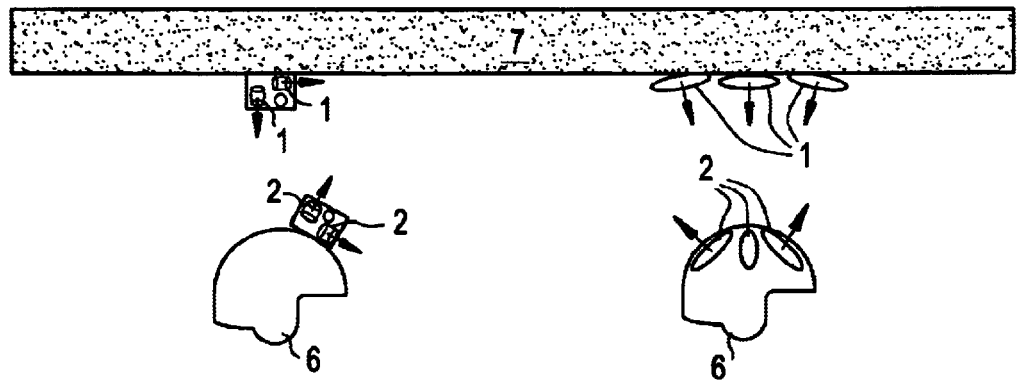

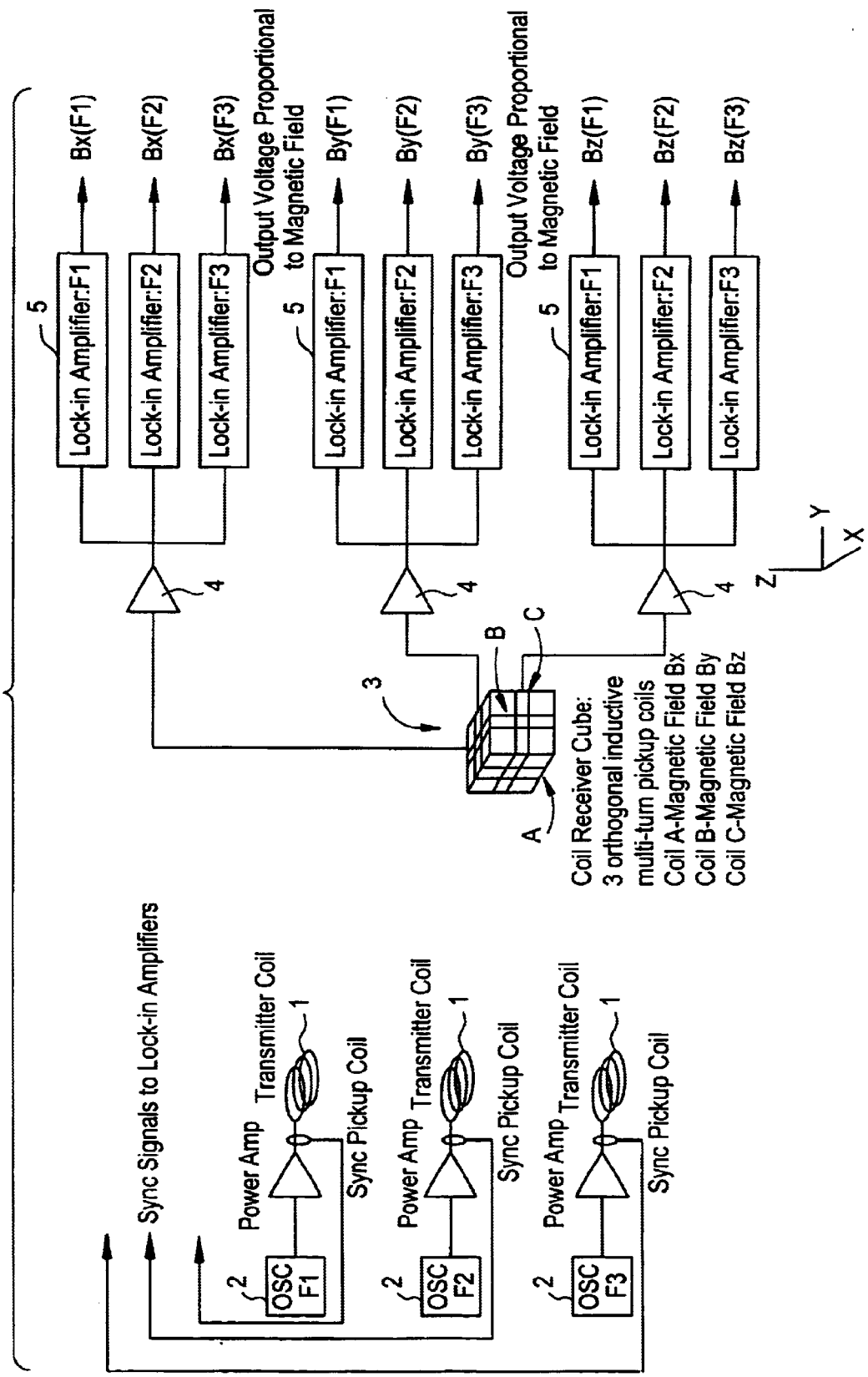

MAGNETIC SENSOR SYSTEM FOR FAST-RESPONSE, HIGH RESOLUTION, HIGH ACCURACY, THREE-DIMENSIONAL POSITION MEASUREMENTS

CROSS REFERENCE TO RELATED APPLICATIONS

This application claims priority from U.S. Provisional Application No. 60/101,534, filed Sep. 23, 1998, which is incorporated by reference in its entirety.

BACKGROUND OF THE INVENTION

1. Field of the Invention

The invention relates generally to sensor systems and, more particularly, to a system capable of fast-response, high resolution, high accuracy three-dimensional position measurement using magnetic sensors.

2. Description of the Related Art

Various systems have been proposed for detecting the position and/or orientation of an object using magnetic or electromagnetic fields. These systems typically employ field transmitters, such as electromagnet coils, disposed at known locations or in a fixed reference frame, and a sensor, such as a coil or other transducer mounted to the object to be located. Each transmitter projects a field varying in space in a fixed frame of reference. The pattern of variation in space for each transmitter is different than the pattern of variation for each other transmitter.

For example, the transmitters may be identical to one another but disposed at different locations or in different orientations. The field patterns of the transmitters are thus displaced or rotated relative to one another, and relative to the fixed frame of reference. The sensor on the object detects the parameters of the field prevailing at the location of the object as, for example, the magnitude and/or direction of the field at the object or the magnitude of individual components of the field at the object in one or more pre-selected directions. The transmitter may be actuated in a predetermined sequence so that at any time only one transmitter is active and therefore the field prevailing at the object is only the field contributed by one transmitter, plus a background field due to the Earth's magnetic field and other environmental sources.

Alternatively, the transmitters can be driven at different frequencies so that components of the signal from the sensor varying at different frequencies represent contributions to the field at the object from different transmitters simultaneously. Based upon the detected parameters of the fields from the individual transmitters, and the known pattern of variation of the field from each transmitter, a computer system calculates the position and orientation of the sensor, and hence the position of the object bearing the sensor, in the fixed frame of reference of the transmitters. In a variant of this system, the object to be located carries the transmitters, whereas a plurality of sensors are disposed at various locations or orientations in the fixed frame of reference. The location and/or orientation of the object is deduced from signals representing the parameter of the field prevailing at the various sensors.

Systems of this general nature are disclosed in U.S. Pat. Nos. 4,849,692; 4,642,786; 4,710,708; 4,613,866 and 4,945,305. Systems according to this general design can be used to provide a three-dimensional spatial input capability for a computer.

U.S. Pat. No. 4,054,881 to Raab discloses three mutually orthogonally radiating antennas each of which transmits electromagnetic radiation to three mutually orthogonal receiving antennas. The receiving antennas measure the radiated signals and produce nine parameters which enable the calculation of the position and orientation of the receiving antennas. No mention is made of determining the velocity or acceleration of the sensor.

U.S. Pat. No. 4,622,644 to Hansen discloses a system which enables the measurement and position of a permanent magnet within a three-dimensional region in five degrees of freedom. In order to sense the position and orientation of the permanent magnet, the system uses three antennas each composed of three mutually orthogonal Hall effect devices. The output voltages from the nine Hall effect devices are inputted into a microprocessor device which first calculates an estimate of the position using a nonlinearized algorithm. Subsequently, the microprocessor uses a linearized algorithm to calculate the precise position and orientation of the permanent magnet. Hansen's device uses Hall sensors, rather than transmitter coils, as the primary sensors.

U.S. Pat. No. 5,729,129 to Acker discloses a system utilizing three electromagnetic transmitters arranged about an electromagnetic detector positioned in the chest of a patient (FIG. 1). The transmitting coils are all arranged in a common plane.

U.S. Pat. No. 5,712,478 to Ollson discloses a system of general interest which utilizes three transmitting and three receiving means. Ollson's system is used to measure the position of a ball joint.

U.S. Pat. No. 5,257,676 to Merkley et al discloses an apparatus for stabilizing levitated objects. Merkley's system is of interest with respect to its teachings relating to position and velocity determination of levitated objects.

These systems are in need of improvement due to several deficiencies in the pertinent art. First, some inventions use a limited number of transmitters and thus can operate over only a limited range. Second, some inventions require a special orientation of the transmitters and/or receivers and are thus limited in applications where such special orientation conditions are not feasible. Third, because the magnetic fields from typical transmitters (i.e., dipole field) vary approximately as the inverse cube of distance from the transmitter, the signal detected by the receiver is very small at long range, yielding a limited effective range of operation and/or the resolution/accuracy of the sensor is also limited.

To overcome the range limitations, received signals from a sensor are time-averaged to reduce environmental and electronic noise effects. The time-averaging increases the signal to noise ratio (SNR), yielding improved range, resolution, or accuracy (or all of the above). The trade-off is that such time-averaging slows the sensor's response time, so that the sensor cannot respond to sudden positional changes (i.e., velocity or acceleration).

Further, in some applications (e.g., car crash test dummy applications), the desired parameter is not just position, but speed and/or acceleration of the test object. To calculate velocity and acceleration, one must differentiate the position data resulting in noisy data or reduced accuracy/resolution.

SUMMARY OF THE INVENTION

Accordingly, it is an object of the present invention to provide a system and process that overcome the deficiencies of the art. There is provided according to the invention a magnetic sensor system for determining the three-dimensional position, velocity and acceleration of an object utilizing magnetic field currents, said sensor system being capable of operating within close proximity to metal surfaces and metal objects, comprising an object, the position, velocity and acceleration of which are to be determined; a three-dimensional fixed reference frame of known dimensions, wherein said object is located within said fixed reference frame; a power source capable of generating a magnetic field within said fixed reference frame; a plurality of magnetic field transmitters, said transmitters operatively interconnected to said power source and capable of being geometrically arbitrarily oriented relative to said fixed reference frame; at least one magnetic field receiver, said receiver capable of receiving electronic signals from said transmitters and further capable of being geometrically arbitrarily oriented relative to said fixed reference frame; a programmed computer, said computer capable of receiving said signals from said receiver and further capable of calculating the position, velocity and acceleration of said object based upon said signals.

There is also provided according to the invention a method for determining the position, velocity and acceleration of an object, comprising providing a three dimensional fixed reference frame of known dimensions; providing an object, the position, velocity and acceleration of which are to be measured; generating electrical current from an oscillator; delivering said current from said oscillator to a power amplifier; directing said amplified current from said amplifier to a plurality of transmitters; generating a magnetic field from said transmitters in said reference frame; receiving said magnetic field signal from said transmitters into at least one receiver; demodulating and amplifying said received magnetic field signal into magnetic field components from said receiver signal, wherein said output from said amplifier is proportional to said magnetic field components; applying a mathematical filter to said demodulated and amplified signal; and applying a mathematical algorithm to calculate the position, velocity and acceleration of said object.

Further objects, features, and advantages of the invention will become apparent from the detailed description that follows.

BRIEF DESCRIPTION OF THE DRAWINGS

FIG. 1 shows the general features of the invention.

FIG. 2 shows several potential embodiments or applications of the invention.

FIG. 3 shows a proof-of-concept, reduction to practice invention block diagram using three transmitters mounted on a plane and three orthogonal receiver coils mounted on a plastic cube for use in the invention.

DETAILED DESCRIPTION

Figure 4:
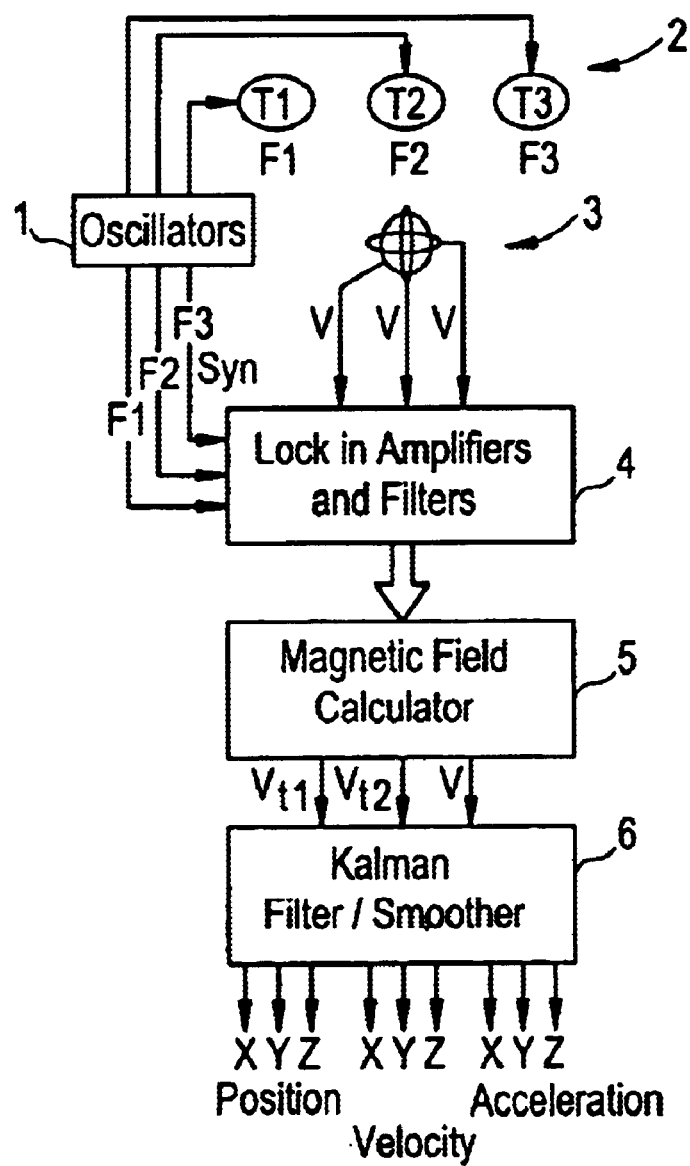
FIG. 4 shows a simplified diagram of the signal processing used with the total magnetic field processing approach for use in the invention.

The present invention is a three-dimensional (3-D) position measuring sensor based on magnetic field measurements. The present invention includes several advantages, as follows.

The sensor system can use an arbitrary number of magnetic field transmitters and magnetic field receivers. The transmitters and receivers can be oriented in an arbitrary geometry relative to a fixed reference frame of the object whose position is being measured. Because multiple transmitters and receivers can be used in the sensor system, two major advantages are realized. First, multiple transmitters can be used to provide signal coverage in a large sensing volume, while most magnetic position sensing systems are limited by the range of the magnetic transmitters and the sensitivity of the magnetic field receivers. Second, the sensor system can operate in close proximity to metal surfaces and objects. For the case of an AC transmitter field, eddy currents generated in the metal by the magnetic transmitter can be modeled and accounted for in the processing algorithm, i.e., the nearby metal generates 'virtual' magnetic field transmitters that can be treated as additional transmitters with their own unique position and orientation.

The sensor system can operate with DC, AC, pulsed DC, or combinations of these magnetic fields. The processing algorithm needs only the magnetic field components of the transmitters and is insensitive to how those measurements are obtained. By placing calibrated magnetic field receivers at a known location in an uncalibrated transmitter geometry, the processing algorithm can determine the transmitter's location in the fixed reference frame. This is an important feature where absolute position measurements are required. The transmitters are modeled as dipoles in the processing algorithm and the sensor system can also be made to be self-calibrating.

The invention can use total field and vector magnetic field components to calculate position. Also, the magnetic field transmitters can include, but are not limited to, induction loops (AC magnetic field generator) and permanent magnets or combinations thereof. Further, the magnetic field receivers should be compatible with the magnetic field transmitters, i.e., an induction loop receiver is an AC magnetic field detector and thus should have an AC magnetic field transmitter. The magnetic field receivers can include, but are not limited to, induction loops, Hall effect sensors, and magneto-resistive magnetic field sensors.

Because of the unique nature of the physics-based processing algorithm, the sensor system does not require the receiver signals to be averaged. Therefore, the measurements can be taken at high speed, thus giving the sensor the advantage of high speed response.

Alternatively, in high magnetic noise environments where response speed is not a requirement, the sensor system can have high spatial resolution/accuracy by averaging the receiver signals (trade-off of speed vs. spatial resolution). For cases where there is high signal-to-noise, the sensor system provides both high speed response and high spatial resolution and accuracy.

For cases where the body under test is constrained to limited motion (i.e., one-dimensional or 3-D with limited axial rotations), the number of receivers can be reduced to less than three, and in some special cases, only one receiver may be used (this has many advantages in measurement systems where space is at a premium).

The processing algorithm uses a physics-based Extended Kalman Filter to solve the non-linear measurement problem and provide 3-D position, 3-D velocity and 3-D acceleration estimates of the object under test.

The invention is described in more detail with reference to the figures. FIG. 1 shows a basic overview of the system for measuring position in three dimensions. The system uses an array of multiple, arbitrarily oriented magnetic field transmitters (1) in a fixed reference frame. The system also employs an array of multiple, calibrated, arbitrarily oriented magnetic field receivers (2), located on the test object (3) in a reference frame fixed to the test object (3), and measures the magnetic field components created by the array of transmitters (1). For AC magnetic field transmitters, the transmitter frequencies are different; for DC magnetic field transmitters, the transmitters are operated sequentially. The array of magnetic field transmitters (1) generate a spatially varying magnetic field in the sensing volume. A method is employed to sort the magnetic field components from the receiver signal (e.g., for an AC transmitter system with multiple frequencies, one can use a synchronous demodulator or notch filter to isolate the multiple frequencies). A physics-based extended Kalman filter is used to solve the non-linear inverse measurement problem and provide 3-D position, 3-D velocity and 3-D acceleration of the test object (3).

FIG. 2 shows several embodiments of the invention. The use of coils in the Figure to represent magnetic field transmitters (1) and receivers (2) is a graphical convenience and should not be construed as to limit the application of other appropriate magnetic field devices. FIG. 2A shows the case where the receivers (2) are located in a concentric, mutually orthogonal system and provide for the measurement of the total magnetic field. FIG. 2B shows the case of an array of multiple transmitters (1) and a single flat receiver coil (5). The transmitters (1) are shown on a transmitter array plane (4) for simplicity and could be located in an arbitrary manner. This case is very useful for measurement systems that have severe space constraints and the receiver (5) has a limited range of motion (either rotationally or constrained in some fashion that can be physically modeled). FIG. 2C shows the case, with the minimum number of transmitters (1) and receivers (2), where all six degrees of freedom of the test object (3) can be measured (i.e., utilizing an arbitrary geometry of receivers (2) fixed to a test object (3)). FIG. 2D shows the case where the orientation of a pilot's helmet (6) can be measured with transmitters (1) located on the canopy (7) and receivers (2) which can be located on the helmet (6).

To demonstrate the invention, the features of the 3-D magnetic position sensor system described above were reduced to practice in a simplified version of the sensor system. FIG. 3 shows a simplified diagram of a sensor system that was constructed to demonstrate the invention. This would be one of many potential embodiments of the invention.

Features of the sensor system in FIG. 3 include: three dipole transmitters (1) mounted at known locations; transmitters (1) operating at three frequencies (2); three orthogonal induction coil receivers mounted on a plastic cube (3) (fixed rigid body); receiver signals are amplified (4); receiver signals are demodulated using lock-in amplifier technology (5) (alternatively, the multiple frequencies in the receiver signal could be digitally, synchronously demodulated by using a high-speed analog-to-digital converter); and employing an extended Kalman filter to solve the non-linear measurement problem and provide position, velocity and acceleration estimates.

Features of the reduced to practice system and algorithm in FIG. 4 include the following: the power oscillators (1) drive the magnetic field transmitters (2), the magnetic field is sensed by magnetic field receivers (3) which are then amplified and synchronously demodulated by nine-channel lock-in amplifiers and filters (4), then the output voltage for each frequency of the lock-in amplifiers (4) is sent to the total magnetic field calculator (5) where the voltages are converted into magnetic field values. An extended Kalman filter/smoother (6) uses the calibration equation of magnetic field as a function of position for each frequency and each receiver (3) to calculate position, velocity and acceleration.

Theory of Operation

The Biot-Savart law was integrated for the transmitter geometry and certain approximations to express the magnetic field as a sum of trigonometric functions were made. Faraday's law on induction was then applied to determine an expression for the induced pick-up coil voltages, the envelopes of which are produced by lock-in amplifiers and sampled by an analog to digital converter. The measurement equation is formulated as a non-linear function of the (assumed) six degrees of freedom of the rigid body. The partial derivatives of the vector measurement equation are evaluated and used by an extended Kalman filter to provide estimates of the position, velocity, and acceleration of the rigid body. In general, any problem specific constraints and dynamics can be modeled in the Kalman filter. However, it is typically assumed that the rigid body is free to experience linear and angular accelerations which are modeled as second order Gauss-Markov random processes.

FIG. 3 shows a detailed layout of the operation of one particular embodiment of the three-dimensional sensor system. An array of transmitter coils (1) generates three frequencies (2) (F1, F2, and F3). The transmitters (1) are typically operated at frequencies in the range of 20 to 100 KHz. The transmitters (1) are made from an IC and an IC power operational amplifier. The transmitter (1) coils are about 3 cm in diameter and have 20 turns of a AWG #22 wire. An in-phase synchronization (sync) signal from each transmitter (1) is obtained by a small coil of wire wound around the output wire of the power operational amplifier. The sync signal is used in the lock-in amplifier (5).

In this embodiment, the receiver (3) is a cube of plastic. Three coils are wound on the cube to form an orthogonal, three-axis coil system. Each of the three coils is wound with 50 turns of AWG#36 wire. The output of each coil at this point is composed of three transmitter signals plus extraneous signals from electric and magnetic noise sources (motors, light, etc.) The output of each receiver coil is amplified with an instrumentation amplifier (4) and then high-pass filtered to remove extraneous noise below 10 KHz (e.g. power line frequencies).

The signals from the transmitter coils (1) are separated (de-modulated) via three lock-in amplifiers (5). The sync signal for the demodulator is obtained from the coil windings on the power amplifier (4) output. The outputs of the lock-in amplifiers (5) are proportional to the different magnetic field components.

As is shown in FIG. 3, the three-dimensional sensor system can be composed of an array of transmitters (1) and a three-axis receiver coil (3). Each transmitter coil (1) operates at a different frequency (2) and creates a unique time varying magnetic field throughout space. The receiver coil (3) 'sees' each of these time-varying magnetic fields. The three-axis receiver (3) measures the three components of the magnetic field from each of the three (or more) transmitters (1) and using a technique similar to triangulation, the position of the receiver coil (3) can be uniquely determined. A variety of transmitter coil configurations can be used. The coil configuration depends on the application and system requirement The exact layout of the sensor array is not critical. Dipole transmitters can be used in some embodiments because of their small size and the fact that an analytical solution to the magnetic field equations is possible. For distances greater than approximately three transmitter coils diameters, the magnetic field from a transmitter coil approximates a magnetic dipole field. The dipole field is proportional to the radial distance between the transmitter and receiver, and the angle between the dipole's axes and the receiver coil's axes. The analytical solution of the magnetic field equations are used in the Kalman filtering equations that are, in turn, used for calculating the unknown position of the receiver coil.

In a spherical coordinate system, the magnetic field from a single dipole transmitter can be approximated as:

$$B_r = \frac{K_1 \cos(\theta)}{r^3}$$

$$B_\theta = \frac{K_2 \sin(\theta)}{r^3}$$

where $B_r$ is the radial and $B_\theta$ is the angular component of the magnetic field relative to the axis of the dipole transmitter; $K_1$ and $K_2$ are variables that depend on the area of the transmitter coil and the amount of current in the coils; and $\theta$ is the angle relative to the dipole transmitter. These equations are valid when the receiver coil is on the order of 2–3 transmitter coils diameters away from the transmitter coil.

Another possible embodiment is a one-dimensional version of the sensor system. This version is composed of a transmitter coil and a receiver coil co-axially located on opposite ends of a telescoping plastic tube. The transmitter coil generates a time-varying magnetic field via a power amplifier connected to an oscillator, which in turn induces an oscillating voltage in the receiver coil. The transmitter-receiver magnetic flux coupling (and consequently the receiver output voltage) varies approximately as the inverse cube of the coil separation distance:

$$EMF \approx \frac{K}{r^3}$$

where K is a proportionality constant dependent on the system parameters and r is the separation distance between the transmitter coil and the receiver coil. From this equation, a direct measure of distance is possible.

In one embodiment of the signal processing system used in the sensor system, the first step is integrating the Boit-Savart law and making certain approximations to express the magnetic field as a sum of trigonometric functions. Then, Faraday's law is applied to determine an expression for the induced pick-up coil voltages, the envelopes of which are produced by lock-in amplifiers and sampled by an analog to digital converter.

The measurement equation is formulated as a non-linear function of the (assumed) six degrees of freedom of the rigid body. The partial derivatives of the vector measurement equation are evaluated and used by an extended Kalman filter in order to iteratively provide estimates of the position, velocity, and acceleration of the rigid body. In general, any problem specific constraints and dynamics can be modeled in the Kalman filter, however, typically it is assumed that the rigid body is free to experience linear and angular accelerations which are modeled as second order Gauss-Markov random processes.

It can be shown that the sampled envelope, denoted by V, output from a single lock-in amplifier can be approximated by:

$$V = K\rho^{-3}[3\rho^{-2}(\hat{n}_t \cdot \vec{\rho})\vec{\rho} - \hat{n}_t] \cdot \hat{n}_r$$

where K is an overall coupling constant, which is a function of the pick-up coil area and amplification, and the transmitter coil dipole moment; $\hat{n}_t$ and $\hat{n}_r$ are the normal unit vectors of the transmitting and receiving coils; and $\vec{\rho}$ is the transmitter-receiver displacement vector, the magnitude of which is simply denoted by $\rho$.

Although $\rho$ and $\hat{n}_r$ are generally non-linear functions of the location and orientation of the rigid body relative to the transmitter, their functional relationship is no more complicated than a simple coordinate transformation. Letting $\overline{X}$ denote the six independent positional variables of the rigid body (three for the center of mass location, three for orientation), the measurement equation is of the form:

$$V_{i,j} = f(\overline{X}, \overline{R}_i, \overline{T}_j, K_{i,j}) = f_{i,j}(\overline{X})$$

where $V_{i,j}$ is the voltage measured by the $i^{th}$ receiver coil due to the $j^{th}$ transmitter, $K_{ij}$ represents the pair-wise coupling constants, $\overline{R}_i$ denotes the $i^{th}$ receiver coil location and orientation in the rigid body coordinate frame, and $\overline{T}_j$ denotes the fixed location and orientation of the $j^{th}$ transmitter.

For a set of n*m measurements (n receivers and m transmitters), there is now an equation relating the measurement vector, $\overline{Z}$, to the unknown state variables, $\overline{X}$:

$$\overline{Z} = \overline{H}(\overline{X})$$

where $\overline{Z}$ and $\overline{H}$ are simply the vector forms of the measurement equations, i.e.

$$\overline{Z} = \begin{bmatrix} V_{1,1} \\ V_{1,2} \\ \vdots \\ V_{n,m} \end{bmatrix} \text{ and } \overline{H} = \begin{bmatrix} f_{1,1}(\overline{X}) \\ f_{1,2}(\overline{X}) \\ \vdots \\ f_{n,m}(\overline{X}) \end{bmatrix}$$

Since the only unknowns are the position variables ($\overline{X}$), these variables can be solved for using an extended Kalman filter, which is a standard non-linear regression technique.

The extended Kalman filter iteratively refines the solution to the measurement problem by combining: 1) prior information about $\overline{X}$ and its first and second time derivatives; 2) the measurement equations described above; and 3) an expression for the gradient of the measurement equation. The ability of this approach to converge on the solution can be understood as follows.

The filter starts an iteration with an estimate of the position variables, denoted by $\hat{\overline{X}}$, which is derived by propagating the previous solution forward in time via the assumed dynamics of the problem, i.e., acceleration states integrate into velocity which in turn integrate into the position states. The six positional state variables, $\overline{X} = [x_1, x_2, x_3, x_4, x_5, x_6]$, are typically chosen to be the Cartesian coordinates ($x_{1...3}$) of the center of mass of the rigid body, and three Euler parameters ($x_{4...6}$), which completely specify the orientation relative to some fixed coordinate system. The initial position estimate, $\hat{\overline{X}}$, is used to predict the value of the measurement vector, $\overline{Z}$, and the difference between the measurement and prediction is used along with the estimated gradient information, to update the estimate.

Let $\Delta \hat{\overline{X}}$ represent the correction needed to $\hat{\overline{X}}$ to reflect the true state of the rigid body. The first order Taylor series expansion for the measurement residual is then given by:

$$(\overline{Z} - \overline{H}(\hat{X})) \approx \left. \frac{\partial \overline{H}(\overline{X})}{\partial \overline{X}} \right|_{\hat{X}} * \Delta \hat{X}$$

which is a linear matrix equation that can be inverted to solve for $\Delta \hat{\overline{X}}$, which when added to $\hat{\overline{X}}$, forms the estimate for the next iteration. When the update, $\Delta \hat{\overline{X}}$, falls below some arbitrary value the process is terminated and the resulting $\hat{\overline{X}}$, is used as a measurement by the extended Kalman filter. The filter uses this new estimate, and information about the measurement noise, and information about the dynamics of the system (e.g., how fast it can accelerate), to update all of the state variables (position, acceleration, and velocity states). The entire process is then repeated for the next measurement vector.

The most cumbersome part of this process is the calculation of the gradient tensor, $$\frac{\partial \overline{H}(\overline{X})}{\partial \overline{X}},$$

in the equation above. For clarity this expression represents the following matrix:

$$\frac{\partial \overline{H}(\overline{X})}{\partial \overline{X}} = \begin{bmatrix} \frac{\partial f_{1,1}(\overline{X})}{\partial x_1} & \frac{\partial f_{1,1}(\overline{X})}{\partial x_2} & \cdots & \frac{\partial f_{1,1}(\overline{X})}{\partial x_6} \\ \frac{\partial f_{2,1}(\overline{X})}{\partial x_1} & \cdot & & \vdots \\ \vdots & & \cdot & \\ \frac{\partial f_{n,m}(\overline{X})}{\partial x_1} & \cdots & & \frac{\partial f_{n,m}(\overline{X})}{\partial x_6} \end{bmatrix}$$

The enumeration of this single matrix in terms of the state variables and the known position of the transmitter coils is a conceptually simple, yet formidable, task. This expansion can be performed and the resulting equations tested by using a combination of data obtained from an earlier "total field" test version of the system and simulated location and orientation trajectories. The earlier test data is not complete enough to allow direct validation of the new algorithm; however, it did allow the validation of the field model and measurement equations. Monte Carlo simulations of the new system with reasonable measurement noise quickly converge to the simulated position.

There are several benefits of this signal-processing algorithm. It can handle any number/configuration of tx's & rx's. The benefits of distributed geometry can be readily evaluated via simulation. It uses near optimal integration of all measurement data, and it can use multiple tx's with repeated frequencies, including coarse grain & fine grain options.

There are other possible variations of the basic system. Other transmitter coil arrangements are possible and the selection of which configuration depends on the application. For conditions where measurements of position are required over a long range, the transmitter coils could be made larger or a linear transmitter (approximation to a line current) could be used. In the case of a linear transmitter, the magnetic field falls off approximately as $r^{-1}$. In addition to changing the transmitter coil's mechanical configuration, the Kalman filter equations would be need to be changed.

Other receiver coil arrangements could also be used. A metal core could be added to the receiver coil to increase magnetic sensitivity. The shape could also be altered to a spherical or other non-cube receiver shape.

The electronic system could be altered having the amplified coil signals digitized and fed directly into a computer or digital signal processing chip, and do all of the signal processing/filtering in software/firmware (i.e., replace the lock-in amplifier with software). This approach would have significant cost improvements for a mass produced system.

This sensor system is a position/motion capture system. Currently it is being developed for use in crash test dummies. However, many other applications are also possible. The system could be used in virtual reality devices to track head and body motion in real-time at high speed. The system could be used in biomechanical analysis; once mounted on the body, it could collect motion data in real-time for analysis on a computer. It could be used in computer graphics to manipulate graphics for animation or simulation. In robotic surgery, the sensor system could localize surgical instruments in three-dimensional space in real-time. The system could be used to develop 3-D measurements and/or the construction of non-metallic objects in 3-D CAD/CAM programs. It could be used in anatomical measurements to make three-dimensional measurements of anatomical features, body volumes, joint relationships, and body contours. The sensor system could also be used to measure high-speed deflection measurements in non-metallic ship hull explosion tests.

It will be understood that the above described embodiments of the present invention are susceptible to various modifications, changes, and adaptations, and the same are intended to be comprehended within the meaning and range of equivalents of the appended claims. Further, although a number of equivalent components may have been mentioned herein which could be used in place of the components illustrated and described with reference to the described embodiment, this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A method for determining the position, velocity and acceleration of an object, comprising:
   providing a three dimensional fixed reference frame of known dimensions;
   providing an object, the position, velocity and acceleration of which are to be measured;
   generating electrical current from an oscillator;
   delivering said current from said oscillator to a power amplifier;
   directing said amplified current firm said amplifier to a plurality of transmitters;
   generating a magnetic field from said transmitters in said reference frame;
   receiving said magnetic field signal from said transmitters into at least one receiver;
   demodulating and amplifying said received magnetic field signal into magnetic field components from said receiver signal, wherein said output from said amplifier is proportional to said magnetic field components;
   applying an extended Kalman filter utilizing a mathematical algorithm to said demodulated and amplified signal to calculate the position, velocity and acceleration of said object.

2. A method as in claim 1, wherein said electrical current is selected from the group consisting of an alternating current source, a direct current source, a pulsed direct current source, and combinations thereof.

3. A method as in claim 1, wherein said mathematical algorithm mathematically models said transmitters as dipoles, said algorithm further uses total field and vector magnetic field mathematical components to calculate said three-dimensional position of said object.

4. A method as in claim 1, further comprising placing calibrated magnetic field receivers at a known location in an uncalibrated transmitter geometry, wherein said algorithm determines the location of said transmitter in said fixed reference frame.

5. A method as in claim 1, wherein said algorithm mathematically averages said signals from said receivers.

6. A method as in claim 1, wherein said algorithm mathematically treats eddy currents generated in metal surfaces and objects nearby said transmitters as virtual magnetic field transmitters, said algorithm further calculating the position and orientation of said virtual magnetic field transmitters.

* * * * *